United States Patent
So

(10) Patent No.: US 6,174,554 B1
(45) Date of Patent: Jan. 16, 2001

(54) ENCAPSULATED LIQUID PRODUCT

(75) Inventor: Rebecca Sui-chun So, New Milford, CT (US)

(73) Assignee: Nestic S.A., Vevey (CH)

( * ) Notice: Under 35 U.S.C. 154(b), the term of this patent shall be extended for 0 days.

(21) Appl. No.: 08/771,753

(22) Filed: Dec. 20, 1996

(51) Int. Cl.$^7$ ............................................ A23L 1/22
(52) U.S. Cl. ............................. 426/98; 426/96; 426/99; 426/534; 426/650; 426/651
(58) Field of Search .............................. 426/96, 98, 99, 426/534, 650, 651

(56) References Cited

U.S. PATENT DOCUMENTS

| | | | |
|---|---|---|---|
| 3,764,346 | * 10/1973 | Noznick et al. | 426/98 |
| 3,914,439 | * 10/1975 | Graves | 426/98 |
| 3,971,852 | * 7/1976 | Brenner et al. | 426/98 |
| 4,232,047 | * 11/1980 | Sair et al. | 426/96 |
| 4,515,769 | * 5/1985 | Merritt et al. | 424/49 |
| 4,707,367 | * 11/1987 | Miller et al. | 426/96 |
| 4,710,391 | 12/1987 | Kirn et al. | 426/289 |
| 4,772,477 | 9/1988 | Weiss et al. | 426/99 |
| 4,803,092 | 2/1989 | Weiss et al. | 426/646 |
| 4,844,918 | 7/1989 | Hoashi | 426/92 |
| 5,079,017 | 1/1992 | Chen et al. | 426/312 |
| 5,098,725 | 3/1992 | Rotman et al. | 426/98 |
| 5,104,672 | 4/1992 | Chen et al. | 426/312 |
| 5,506,353 | * 4/1996 | Subramaniam | 426/651 |
| 5,580,593 | * 12/1996 | Liu et al. | 426/98 |

FOREIGN PATENT DOCUMENTS

| | | |
|---|---|---|
| 0 630 580 A2 | 12/1994 | (EP) . |
| 92/04037 | 3/1992 | (WO) . |
| 94/06308 | * 3/1994 | (WO) . |

OTHER PUBLICATIONS

Food Manufacture International 1993, vol. 10(5) 32–33, by I. Ramsey From HHP to 'one stop shopping'.
Food Technology 1991, 45 (3) 116, 118–120, 122–124, 126, 128, 130, 132, by J.D. Dziesak "A focus on gums".
Japanese Abstract to JP 1042419, Feb. 1989.
Japanese Abstract to JP 60066935, Apr. 1985.
Japanese Abstract to JP 7267850, Oct. 1995.

* cited by examiner

Primary Examiner—Lien Tran
(74) Attorney, Agent, or Firm—Pennie & Edmonds LLP

(57) ABSTRACT

A dry food base, such as dry soup and gravy food base, which includes a polysaccharide encapsulated oil based flavor that contain an edible coating which is effective for delaying release of flavor during storage. In particular, an encapsulated oil based flavor coated with a gum, a lipid or mixtures thereof.

20 Claims, No Drawings

ENCAPSULATED LIQUID PRODUCT

TECHNICAL FIELD

The present invention relates to a dry food product comprising encapsulated oil based flavor, and more particularly to dry food products for sauce or gravy which include dried hydrolyzed protein.

BACKGROUND ART

Oil based flavors are used as ingredients in dry mix food bases. The dry food base is used, for example, for liquid food products such as soup bases or gravy mixes. These food bases are mixed with warm liquids such as water or milk and, if necessary, heated to form the liquid food product. The dry food base may also be a seasoning mix which is typically used by sprinkling it onto other food products.

The oil based flavor is, for example, an oil prepared by thermal treatment of fat, oil or fatty acids. Many oil based flavors are sensitive to heat and susceptible to oxidation. In order to prolong the stability of such flavors in commercial products, it is known to trap the oil based flavor in starch products or encapsulations.

Despite these procedures, it has been found that such products deteriorate and generate off-flavors when stored for long periods, for example a year or more. In particular, when the encapsulated oil is part of a dry mix, the encapsulated oil has been found to interact with other ingredients in the dry food base, and deterioration of the oil based flavor will accelerate. Dried soups and gravy bases or seasonings mixes usually include hydrolyzed proteins. The presence of hydrolyzed proteins in such products has been found to have a deteriorating effect on the encapsulated oil. Thus, improvements in this area are desired.

SUMMARY OF THE INVENTION

The present invention relates to a dry food base comprising a polysaccharide encapsulated oil based flavor which includes an edible coating thereon in an amount effective to delay release of the flavor during storage.

The edible coating preferably comprises a lipid, a gum, such as carrageenan gum, or mixtures thereof. The polysaccharide may be a starch, a modified starch, a maltodextrin or mixtures thereof. Also, silica can be added in an amount effective to enhance flowability of the dry food base.

The amount of edible coating may be between about 0.5 and 50 grams per kilogram of encapsulated oil based flavor. When a carrageenan gum is used as the edible coating, the amount is preferably between about 0.5 and 2.5 grams per kilogram of encapsulated oil based flavor.

Typically, the dry food base also contains hydrolyzed protein, but the coated product remains stable during storage.

Another aspect of the invention is a method for delaying release of flavor during storage from a dry food base which comprises forming a polysaccharide encapsulated oil based flavor, and coating the polysaccharide encapsulated oil with an edible coating in an amount effective to delay release of the flavor during storage of the dry food base. In this method, the polysaccharide encapsulated oil flavor is advantageously prepared by forming a mixture comprising about 1 to 20 percent by weight of an oil based flavor, about 8 to 33 percent by weight of a starch, about 8 to 33 percent by weight of a maltodextrin, and water; and then spray drying the mixture to form the polysaccharide encapsulated oil based flavor. The edible coating materials and amounts applied would be the same as described above.

DETAILED DESCRIPTION OF THE PREFERRED EMBODIMENTS

In the present invention, the term "dry food base" is used to define a product which can be used for soup, gravy and sauce, bouillon, past savory bases, or seasoning. The dry food base may be mixed with liquid to form a liquid food product, for example, by adding warm or hot water, milk products, soups, etc. The dry food base may be used to flavor, enhance or season the flavor of a food product, such as by sprinkling the mix thereon. The dry food base may be compacted in lumps or cubes or may be in powder form. Thus, the dry food base according to the invention will have a moisture content of about 1 to 6% by weight.

The oil based flavors are generally based on fats, oils or fatty acids which have been subjected to a conventional thermal treatment. One example of an oil based flavor is a flavor based upon thermally treated fatty acids. This thermal treatment is made, for example, by distillation and controlled combustion. Thermal treatments of this type are disclosed in U.S. Pat. Nos. 5,104,672 and 5,079,017, the content of each of which is expressly incorporated herein by reference thereto for further disclosure of such thermal treatments.

Preferably, the flavor is released within about ten seconds in hot (i.e., 60 to 80° C.) water. Advantageously, the flavor is designed to remain stable under household conditions, with the product not being sealed in a protective package.

The polysaccharide encapsulation material is preferably a starch, a modified starch, a maltodextrin or a combination thereof. These materials are generally known to one of ordinary skill in the art and need not be further described herein.

Encapsulation of the oil based flavor may be achieved by forming a mixture of the polysaccharide encapsulation material, water, and the oil based flavor, and then by spray drying the mixture. Alternatively, the oil based flavor may be sprayed into a rotary pan containing the polysaccharide material so as to form capsules prior to curing the capsules to their final state. The encapsulation may also be generated by extruding the oil based flavor and polysaccharide material and then cutting the extrudate to small particles. The encapsulation of the oil based flavor may also be achieved by a conventional spray-drying method or by spraying a mixture of oil based flavor and polysaccharide material into a chamber that contains another portion of the polysaccharide material while hot air is circulated in the chamber. The hot air agitates the particles to facilitate relatively uniform contact of the sprayed material on the particles and also helps to dry the flavor.

The relative amounts of the components in the encapsulated oil based flavor can vary over wide ranges. The oil based flavor is typically found in the mixture before encapsulation at an amount of about 1 to 20 percent by weight, with about 6 to 14 percent being preferred. The amount of starch will generally be in the range of about 8 to 33 and preferably about 15 to 25 percent by weight. The amount of maltodextrin would be about the same as the amount of starch. Water typically represents the remainder of mixture.

After the flavor is encapsulated, an edible coating is applied onto the flavor capsules. This coating preferably comprises a lipid, gum or combination thereof. When a lipid is used, it is preferred to use one that has a relatively low melting point of about 40 to 70° C. Advantageously, hydrogenated vegetable oil is used. The gums which are suitable in this invention include carrageenans, alginates, pectins or combinations thereof. Other suitable gums include guar gum, locust bean gum and carboxymethyl cellulose ("CMC"). The most preferred gum is carrageenan.

In order to apply the coating, the coating material must first be made into liquid form. This is generally accomplished by heating the material to an appropriate temperature. For the lipids, the melting point of the material must be exceeded to transform the lipid to a liquid which can be sprayed upon the particles. Generally, an amount of about 5 to 50 g liquid lipid per Kg particles is sufficient, with about 15 to 25 g per Kg preferred.

For gums such as carrageenan or the like, a water solution is made by heating the gum to about 85° C. The gum represents about 0.5 to 2.5% by weight of the solution. Typically, about 100 ml of the solution is sprayed onto about 1 Kg of the capsule particles, so that the amount of gum applied to coat the particles is about 0.5 to 2.5 g per Kg. An application of about 1 g gum per Kg of capsules is preferred.

For either embodiment, the edible coating material, in the form of a liquid or solution, is simply sprayed into the chamber after the capsules are formed and while the hot air is circulating. This is done in essentially the same manner as described above with regard to the encapsulation step.

Silica may be added to the encapsulation or as a coating for improving the flowability of the dry food base. Furthermore, Headspace Gas Chromatography data indicate that it also entraps the flavor within the capsules. The silica may be added to the liquid mixture prior to spraying in amount of about 0.5 to 5 percent by weight and preferably about 1 to 3 weight percent.

Another aspect of the invention relates to a method for delaying the release of flavor during storage from a dry food base that contains a polysaccharide encapsulated oil based flavor, wherein the polysaccharide encapsulated oil is coated with an edible coating of the types described above. Thus, the definitions and components which are described above are also applicable to the method of the invention.

The invention also relates to a dry food base comprising a polysaccharide encapsulated oil based flavor and hydrolyzed protein wherein the improvement comprises an edible coating of the encapsulated oil based flavor in an amount is effective to delay the release of flavor during storage. Such dry food base is used e.g. for the preparation of a soup, gravy, sauce etc. However, it will be appreciated that use of the dry food base in a mixture of polysaccharide encapsulated oil based flavor and hydrolyzed protein is not limited to the applications discussed above.

Furthermore, it will be appreciated that the invention also extends to the protection of encapsulated oil based coatings from attack from other ingredients such as sugars and proteins.

EXAMPLES

The following examples further illustrates the present invention.

An encapsulated oil based flavor in accordance with the invention was produced in the following way. A dry mix of maltodextrin and modified starch was dispersed in preheated water and stirred to prevent lump formations. The slurry was then heated to 40 to 50° C. Oil based flavor and silica, if applicable, was added. The mixture was then homogenized under pressure and spray dried to for an encapsulated oil based flavor. Ingredients used in the preparation of the encapsulated oil based flavor are shown in Table 1 where the amounts are given in percent by weight.

TABLE 1

|  | Sample | |
| --- | --- | --- |
|  | A | B |
| Water | 50% | 50% |
| Modified Starch | 20% | 19% |
| Maltodextrin | 20% | 19% |
| Oil Based Flavor | 10% | 10% |
| Silica | — | 2% |

Samples A and B were uncoated and represent the prior art. To form Samples representative of the invention, edible coatings were sprayed onto Samples A and B using the same spray drying process as was used for the encapsulation.

Sample C is the same encapsulated material as Sample A but coated with carrageenan gum. To coat this sample, 5 g of carrageenan gum (Iota Carrageenan) and 2.5 g of Tween 60 emulsifer were mixed in water and heated to 85° C. to form a solution containing the carrageenan in liquid form. 100 ml of this solution were sprayed onto 1 kg of the Sample A encapsulated material.

A Sample D is the same encapsulated material as Sample A but coated with Capol 173. In this process, Capol 173, was melted by heating to 50° C. 18 g of this lipid were sprayed onto 1 kg of the Sample A encapsulated material.

The physical properties of the four samples were measured and are presented in Table 2.

TABLE 2

|  | Sample | | | |
| --- | --- | --- | --- | --- |
|  | A | B | C | D |
| % Total Fat | 20.71 | 20.37 | 30.71 | 22.41 |
| % Surface Oil | 0.06 | 0.09 | 0.04 | 1.55 |
| % Moisture initial | 1.72 | 1.68 | 2.78 | 1.52 |
| at 86° F., 6 months | 2.16 | 1.88 | 2.50 | 1.49 |

The low surface oil of each sample is an indication of an effective encapsulation.

Samples A, B, C and D were then stored at 86° F. and monitored by sensory evaluation once a month for 12 months. At each evaluation time, a tasting panel of the same group of judges was used. The evaluation consisted of 13 different sensory attributes. Variance analysis or sensory evaluation was used to test for differences between the samples for each sensory attribute, while multivariate analysis was used to test for differences between samples for all the sensory attributes simultaneously.

After 1 year of storage in dry soup and gravy bases at 86° F., the result of the statistical analysis of the sensory attributes showed that the samples coated with lipid or carrageenan were the most preferred ones. The samples treated according to the invention thus showed a significant reduction in the release of the oil based flavor.

Of the encapsulated oil based flavor which was coated with carrageenan gum, the samples which were produced with the spray drying method, as opposed to the other methods mentioned above, received the highest ranking.

The samples were also analyzed in a Headspace Gas Chromatograph. It was found that the high volatile loss was slowest in the samples that contained the carrageenan coating. The same phenomena were observed whether the samples were stores separately or in a dry soup base. This indicates that the encapsulated flavored oil treated according to the invention have a prolonged stability.

The Headspace Gas Chromatography results also showed that sample D (i.e., the lipid coating) had delayed flavor release under heating compared with reference Sample A. This also indicates that the lipid coated Sample D has better stability.

Differential Scan calorimetry was conducted to further determine and compare the stability of the samples. The results showed that the coated samples were more stable under heating than uncoated samples. The data also showed that samples with coating had less oil melting. Several small peaks were generated at the 175° C. area in reference Sample A but not in the samples that included coatings.

After 6 months at 87° F., the silica containing Sample B and the coated Samples C and D had absorbed much less water with than reference Sample A (see Table 2). The samples treated according to the invention thus showed better overall stability.

What is claimed is:

1. A dry food base comprising capsules having a core of an oil based flavor encapsulated in a polysaccharide and an edible coating thereon which acts to reduce deterioration of the encapsulated oil based flavor in contact with sugar or protein ingredients during storage; the edible coating being present in an amount effective to delay release of the flavor during storage and to release the oil based flavor when the capsules contact a liquid having a temperature of between 60° C. and 80° C.; wherein the edible coating is a lipid having a melting point of about 40 to 70° C., a gum, or a mixture of both.

2. A dry food base according to claim 1, wherein the edible coating comprises a lipid.

3. A dry food base according to claim 1, wherein the edible coating comprises a gum.

4. A dry food base according to claim 3, wherein the edible coating comprises carrageenan.

5. A dry food base according to claim 1, wherein the edible coating comprises both a lipid and a gum.

6. A dry food base according to claim 1, wherein the polysaccharide comprises a modified starch.

7. A dry food base according to claim 1, wherein the polysaccharide comprises a maltodextrin.

8. A dry food base according to claim 1, wherein silica is added in an amount effective to enhance flowability of the dry food base.

9. The dry food base according to claim 1, wherein the amount of edible coating is between about 0.5 and 50 grams per kilogram of encapsulated oil based flavor and deterioration of the encapsulated oil-based flavor is prevented for one year during storage.

10. A dry food base according to claim 2, wherein the amount of edible coating is between about 0.5 and 2.5 grams per kilogram of encapsulated oil based flavor.

11. A dry food base according to claim 4, wherein the amount of edible coating is between about 0.5 and 2.5 grams per kilogram of encapsulated oil based flavor.

12. A dry food base comprising flavor capsules and hydrolyzed proteins, wherein the capsules have a core of an oil based flavor encapsulated in a polysaccharide and an edible coating thereon which acts to reduce deterioration of the encapsulated oil based flavor with the hydrolyzed proteins during storage; the edible coating being present in an amount effective to delay release of the flavor during storage, and to release the oil based flavor when the capsules contact a liquid having a temperature of between 60° C. and 80° C.; wherein the edible coating is a lipid having a melting point of about 40 to 70° C., a gum , or both.

13. A dry food base according to claim 12, wherein the edible coating comprises a lipid.

14. A dry food base according to claim 12, wherein the edible coating comprises a gum.

15. A dry food base according to claim 12, wherein the edible coating comprises both a lipid and a gum.

16. The dry food base according to claim 12, wherein the amount of edible coating is between about 0.5 and 50 grams per kilogram of encapsulated oil based flavor and deterioration of the encapsulated oil-based flavor is prevented for one year during storage.

17. A method for delaying release of oil based flavor during storage and for reducing deterioration of the encapsulated oil based flavor in contact with sugar or protein ingredients during storage from a dry food base which includes an oil based flavor, which method comprises encapsulating the oil based flavor in a polysaccharide to form a core and coating the core with an edible coating of a lipid having a melting point of about 40 to 70° C., a gum or a mixture of both, with the coating being provided in an amount effective to delay the release of the oil based flavor during storage and to reduce deterioration of the encapsulated oil based flavor when in contact with sugar or protein ingredients during storage of the dry food base and subsequently contacting the encapsulated flavor with a liquid having a temperature of between 60° C. and 80° C. to release the oil based flavor therein.

18. A method according to claim 17 wherein the polysaccharide encapsulated oil based flavor is prepared by forming a mixture comprising about 1 to 20 percent by weight of an oil based flavor, about 8 to 33 percent by weight of a starch, about 8 to 33 percent by weight of a maltodextrin, and water; and spray drying the mixture to form the polysaccharide encapsulated oil based flavor.

19. A method according to claim 18 wherein the coating is applied to the encapsulated oil based flavor in an amount of between about 0.5 and 50 grams per kilogram and deterioration of the encapsulated oil-based flavor is prevented for one year during storage.

20. A dry food base comprising capsules having a core of an oil based flavor encapsulated in a polysaccharide and an edible coating thereon which acts to reduce deterioration of the encapsulated oil based flavor in contact with sugar or protein ingredients during storage; the edible coating being present in an amount of 0.05 to 5% by weight of encapsulated oil based flavor to delay release of the flavor under ambient storage conditions, and to release the oil based flavor when the capsules contact a water having a temperature of between 60° C. and 80° C.; wherein the edible coating is a lipid having a melting point of about 40 to 70° C., a gum, or a mixture of both.

* * * * *

UNITED STATES PATENT AND TRADEMARK OFFICE
CERTIFICATE OF CORRECTION

PATENT NO. : 6,174,554 B1
DATED : January 16, 2001
INVENTOR(S) : Rebecca Sui-chun So Page 1 of 1

It is certified that error appears in the above-identified patent and that said Letters Patent is hereby corrected as shown below:

<u>Title page,</u>
Item "[73] Assignee": change "Nestic S.A." to -- Nestec S.A. --.

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*